United States Patent [19]

Calvert

[11] 4,392,519
[45] Jul. 12, 1983

[54] KNIFE PITCH CONTROL FOR VENEER LATHE

[75] Inventor: Harry B. Calvert, Longwood, Fla.

[73] Assignee: Calvert Manufacturing, Inc., Longwood, Fla.

[21] Appl. No.: 231,872

[22] Filed: Feb. 5, 1981

[51] Int. Cl.³ .............................................. B27L 5/02
[52] U.S. Cl. ................................ 144/212; 73/862.06; 144/356; 364/174
[58] Field of Search ................ 73/862.06; 144/209 R, 144/211, 212, 213, 356; 364/478, 174; 83/522

[56] References Cited

U.S. PATENT DOCUMENTS

| | | |
|---|---|---|
| 2,329,541 | 9/1943 | Kuehnl .............................. 73/862.06 |
| 2,477,457 | 7/1949 | Hughes .............................. 73/862.06 |
| 2,670,626 | 3/1954 | Hall . |
| 2,924,968 | 2/1960 | Colten et al. . |
| 3,161,044 | 12/1964 | Harrison et al. . |
| 3,244,206 | 4/1966 | Bossen . |
| 3,303,693 | 2/1967 | Stedman . |
| 3,596,506 | 8/1971 | Wilson, Jr. ......................... 73/862.06 |
| 3,680,613 | 8/1972 | Daniels et al. ...................... 144/209 |
| 3,826,131 | 7/1974 | Pritschow .......................... 73/862.06 |
| 4,197,888 | 4/1980 | McGee et al. . |

FOREIGN PATENT DOCUMENTS 485330  9/1975  U.S.S.R. ........................... 73/862.06

*Primary Examiner*—W. D. Bray
*Attorney, Agent, or Firm*—Leydig, Voit, Osann, Mayer & Holt, Ltd.

[57] ABSTRACT

A veneer lathe having power spindle means for rotating a log on the spindle axis, a knife carriage disposed for movement transversely of said spindle axis, a knife rockably mounted on the carriage for movement laterally of the spindle axis, means for adjusting the pitch of the knife as it is moved toward the spindle axis, and means for correcting the pitch adjustment in accordance with lateral deflecting forces on the knife. A sensing device mounted adjacent the knife utilizes lateral deflection of the knife edge during the veneer peeling operation to generate a signal indicating the direction and amplitude of the deflection. The signal may be applied directly to a suitably calibrated deflection indicator. It may also be amplified and utilized to effect a correction in the pitch adjusting means so as to maintain the lateral forces on the knife in approximate balance, with a slight bias toward the wood.

12 Claims, 9 Drawing Figures

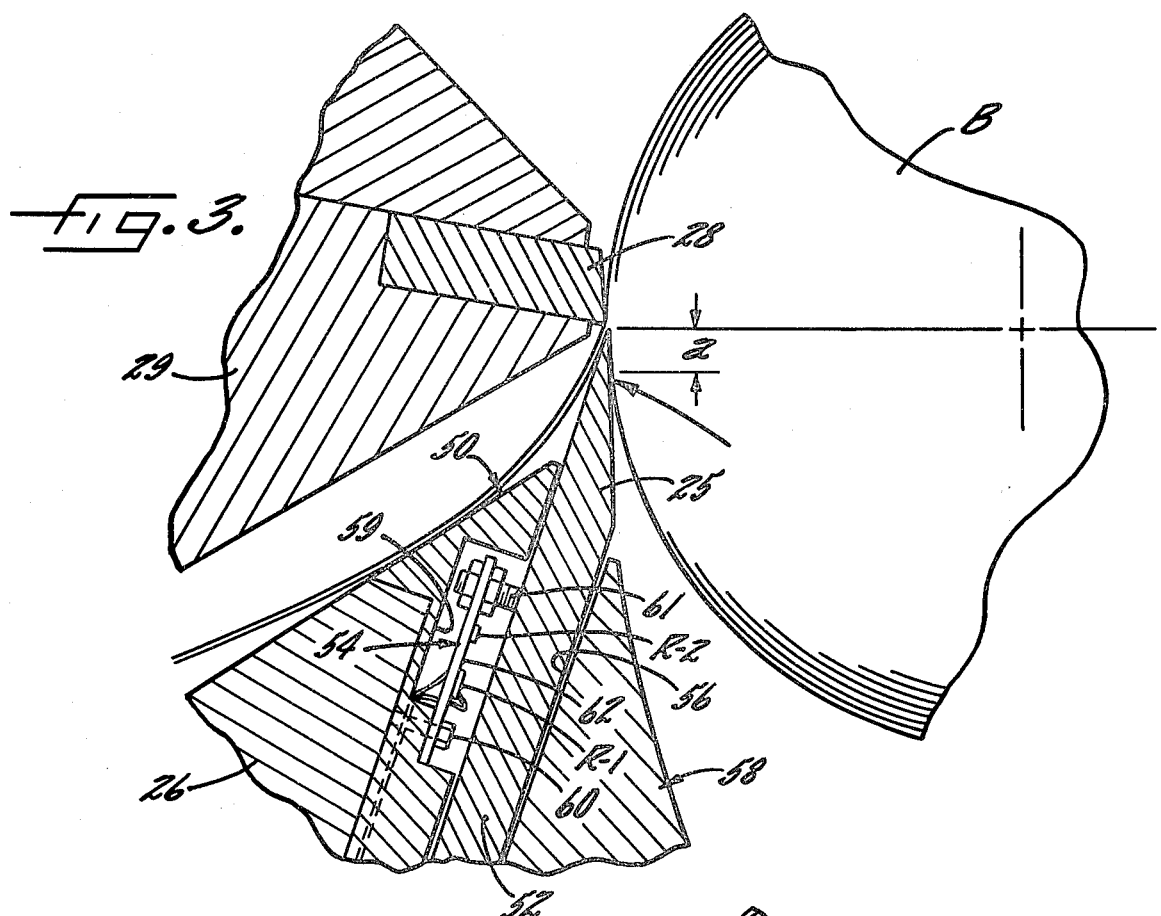
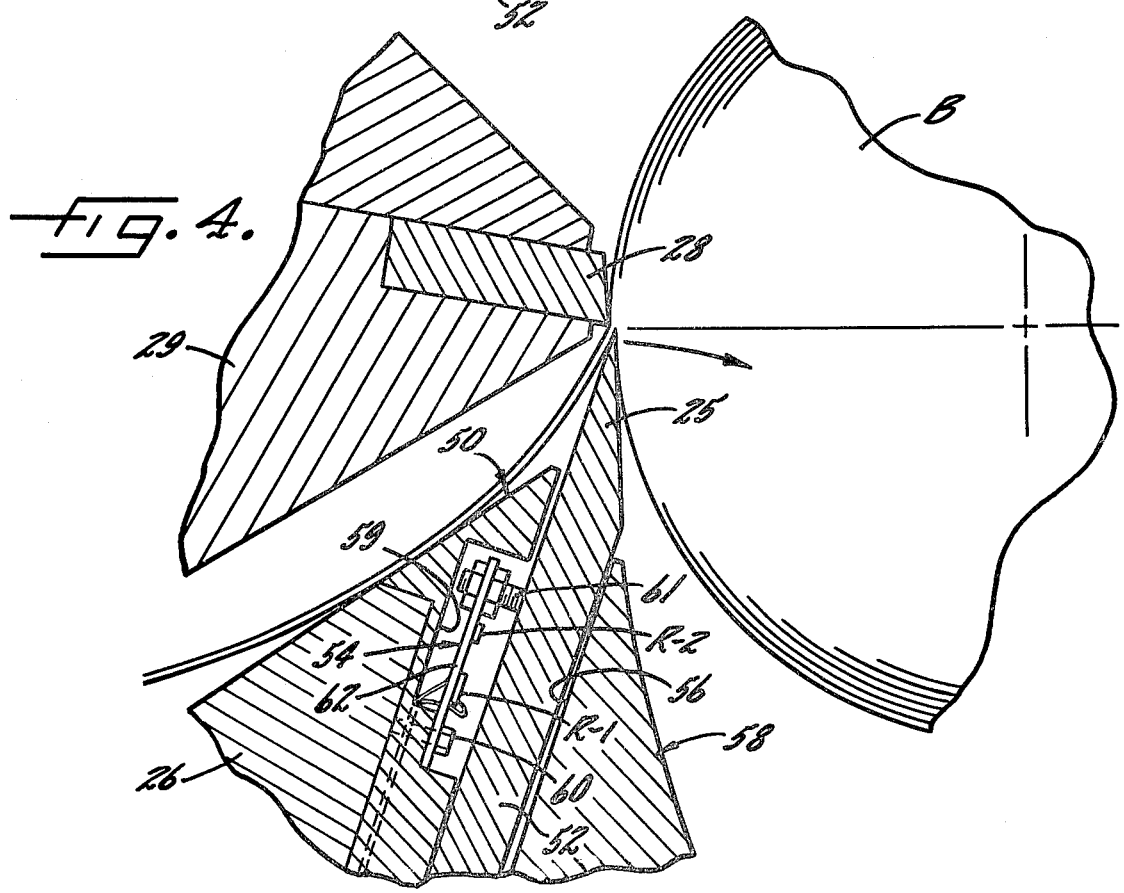

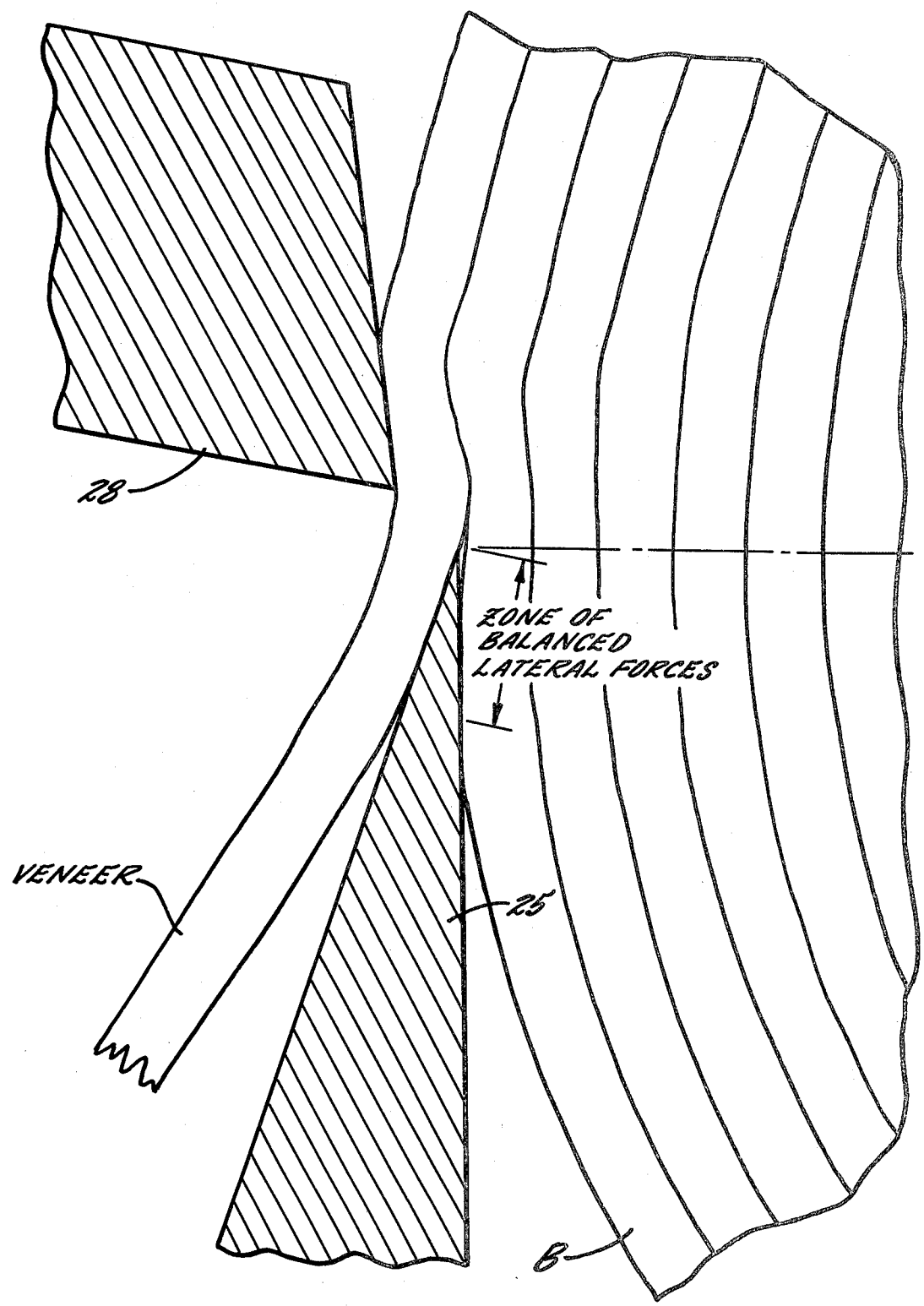
_Fig. 5._

KNIFE PITCH CONTROL FOR VENEER LATHE

BACKGROUND OF THE INVENTION

The present invention relates to wood working machines known as veneer lathes which produce veneer by turning or "peeling" a log against a non-rotating knife blade. Such machines are adapted to process many different kinds of wood, varying from soft wood such as southern pine for structural plywood to hardwoods such as oak or birch for furniture veneer.

A typical veneer latche which represents the environment for the present invention is a dual spindle machine having a pair of axially spaced headstocks mounted on a common bed. Each headstock contains a pair of power driven, axially extensible spindles telescoped one within the other, the inner spindle having a chuck on the order of $4\frac{1}{2}''$ in diameter and the outer spindle a chuck on the order of $6\frac{1}{2}''$ in diameter. A veneer knife and pressure bar are mounted on a knife carriage which is driven along parallel guideways extending transversely of the spindle axis. The veneer lathe also includes one or more backup rolls adapted to preclude deflection of the log during the veneer peeling operation.

The log processed into veneer by the lathe is known as a "block." A common block for construction plywood veneer, for example, may be a southern pine log about 102" long with an average diameter of about 12". Bark has been removed and the outside profile is irregular due to the natural growth pattern of the tree. The block has been pretreated by application of steam or immersion in hot water and its temperature on loading into the lathe is on the order of 160-170 degrees Fahrenheit. The optimum product recovered from this block is a sheet 54" wide and 102" long—eventually trimmed to 48"×96" in the finished panel. The minimum usable piece is 6" wide by 54" long—used for the inner crossband layer.

In the cutting process, lathes are equipped to detect the approximate diameter of an incoming block and retract the knife carriage automatically to clear the wood by several inches. To initiate the cut, the knife carriage is advanced cautiously until the highest protruding wood engages the knife, then locked into an advanced feed rate of approximately double veneer thickness. When a point is reached at which the minimum 6"×54" sheet can be detected, the knife will abruptly leave the cut and allow time for the waste "tail" to clear the production belts. At that time the knife will advance and re-enter the cut at the same point it had left. Cutting will be continuous from then until minimum diameter is reached. The lathe will peel a 12" diameter block of southern pine down to a 5" minimum diameter in 5 to 6 seconds.

In a veneer lathe, the angle between a horizontal plane at the knife edge and the ground face of the knife is known as the pitch of the knife or knife angle. During veneer peeling, the required pitch varies depending upon the kind of wood and the thickness of the veneer to be produced. The pitch also must be varied as the diameter of the log decreases and veneer is peeled away from it.

When the forces on the knife tend to make it pull into the wood of the block, the knife is said to be "leading." When the forces on the knife tend to push it out of the wood, the knife is said to be "heeling." Based on experience and observation, I have noted that the optimum pitch angle of the veneer knife is one where the lateral forces on the knife are in substantial equilibrium, with a slight bias or lead toward the wood.

SUMMARY OF THE INVENTION

The general aim of the present invention is to provide a means for detecting the direction and amplitude of lateral deflection of a veneer lathe knife edge from a condition of substantial equilibrium during veneer peeling so that a proportional correction in knife pitch adjustment can be made.

Another object of the invention is to provide a sensing device mounted adjacent the knife of a veneer lathe utilizing lateral deflection of the knife edge during the veneer peeling operation to generate a signal indicating both direction and amplitude of lateral deflection, which signal may be amplified and utilized to effect a correction in the pitch adjusting means of the lathe so as to maintain the lateral forces on the knife in approximate balance, with a slight bias toward the wood.

Another object of the invention is to provide an appropriate supporting means for a veneer lathe knife which will permit unobstructed lateral deflection of the knife edge leaving the adjacent portion of the knife accessible for application of a deflection sensing device.

Other objects and advantages will become apparent as the following description proceeds, taken together with the accompanying drawings, described below.

DESCRIPTION OF THE DRAWINGS

FIG. 3 is an enlarged fragmentary transverse sectional view through the knife frame, pressure bar frame and log in the veneer lathe of FIG. 1, illustrating the application of a resultant lateral force causing the knife to heel.

FIG. 4 is an enlarged fragmentary transverse sectional view similar to FIG. 3, but showing the application of a resultant lateral force on the knife causing it to lead into the wood.

FIG. 5 is a further enlarged fragmentary diagramatic view illustrating the peeling of veneer and its flow through the gap between the cutting edge of the knife and the projecting end of the nose bar.

Figure 1:
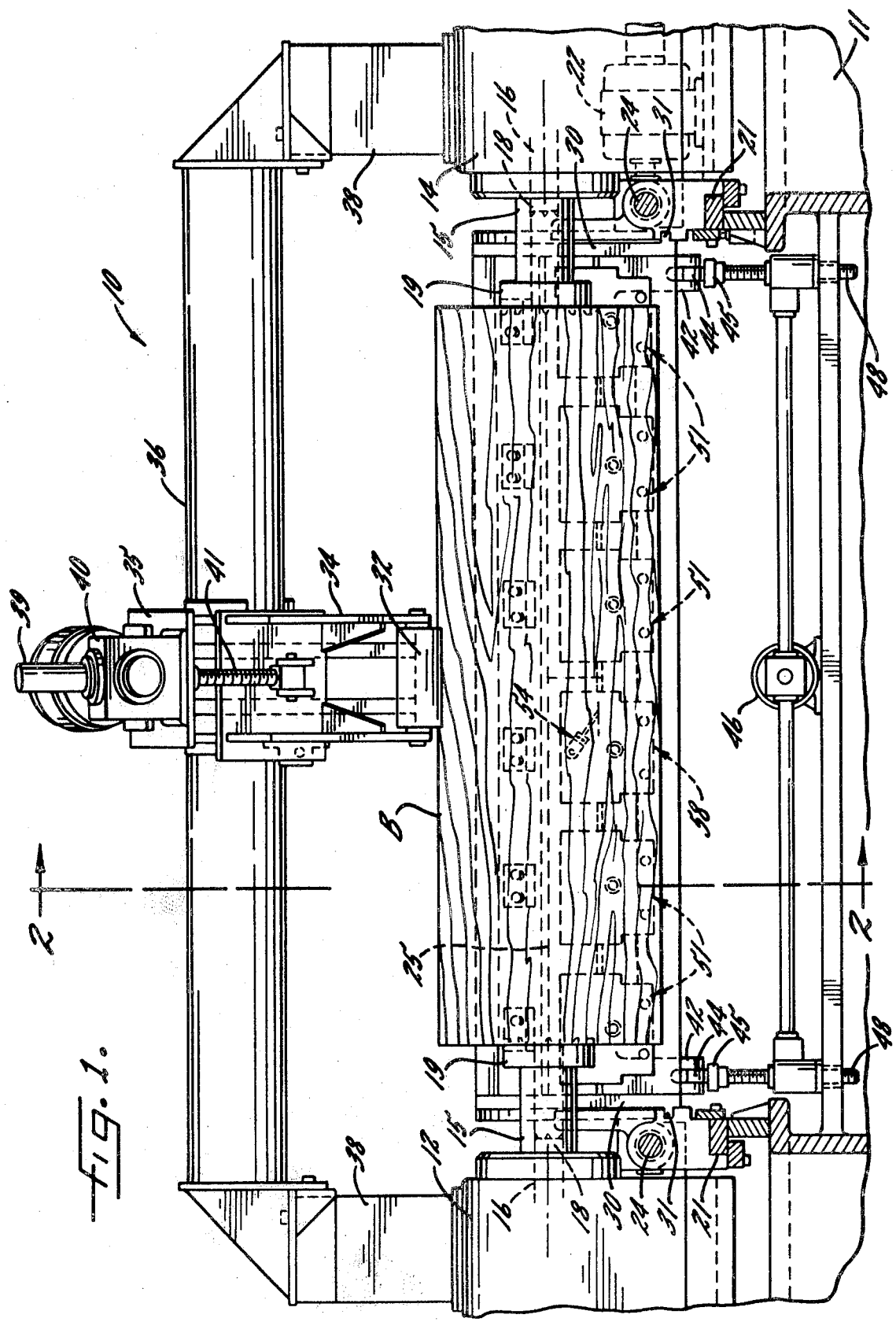
FIG. 1 is a front elevational view of an illustrative veneer lathe in which the present invention is exemplified.

While the invention is susceptible of various modifications and alternative constructions, a certain illustrative embodiment has been shown in the drawings and will be described below in considerable detail. It should be understood, however, that there is no intention to limit the invention to the specific form described but, on the contrary, the intention is to cover all modifications, alternative constructions and equivalents falling within the scope of the appended claims.

DESCRIPTION OF THE INVENTION

Figure 2:
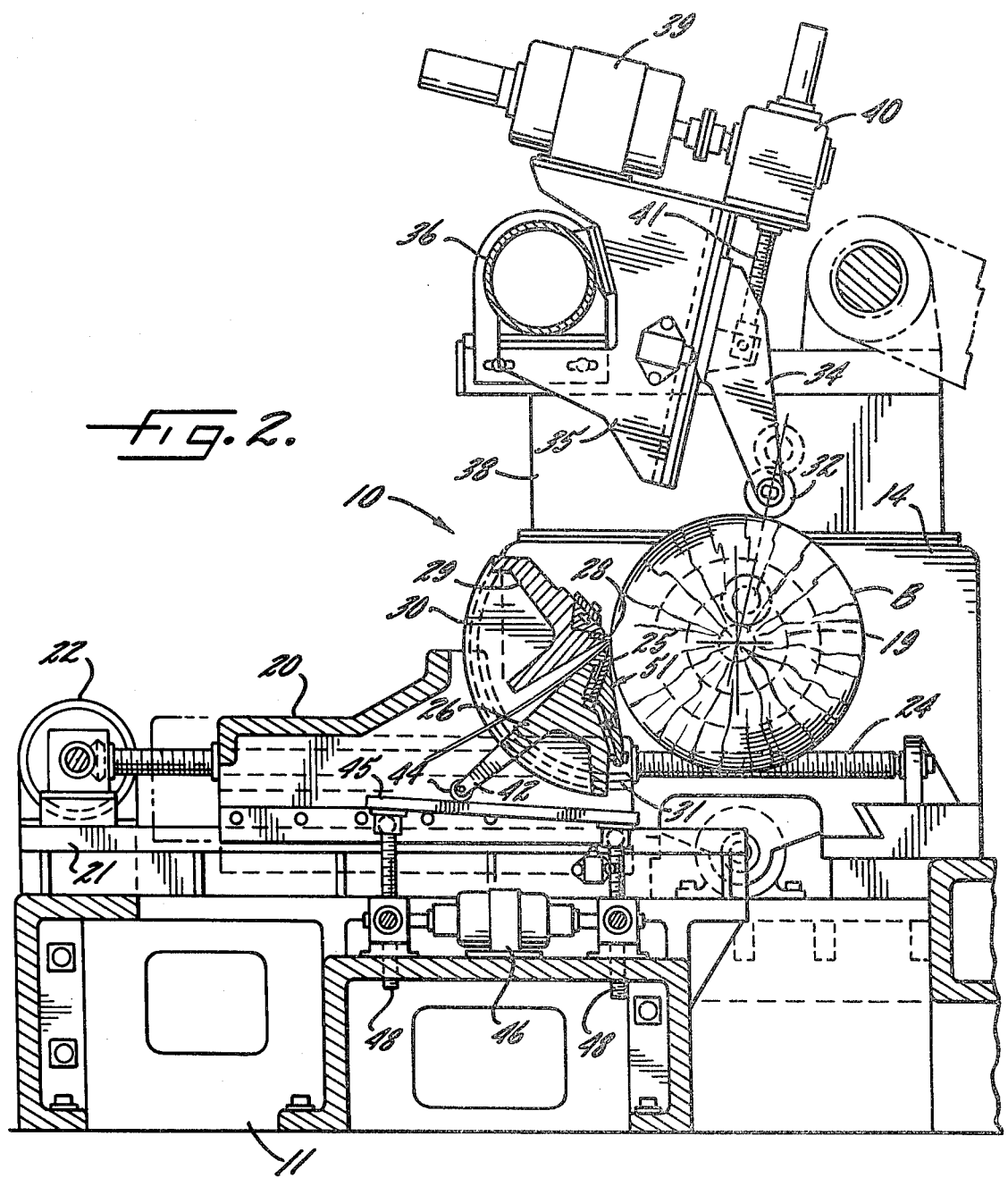
FIG. 2 is a vertical sectional view taken through the veneer lathe of FIG. 1 in the plane of the line 2—2.

Referring more specifically to FIGS. 1 and 2, the invention is there exemplified in an illustrative veneer lathe 10 of the dual spindle type. The lathe 10 comprises a bed 11 which rests on a suitable foundation and supports a pair of axially spaced headstocks 12, 14. Each headstock contains a pair of power driven, axially extensible spindles 15, 16, telescoped one within the other, the inner spindle having a chuck 18 on the order of $4\frac{1}{2}''$ in diameter and the outer spindle a chuck 19 on the order of $6\frac{1}{2}''$ in diameter. A knife carriage 20 is mounted for reciprocating movement on a pair of ways 21 fixed to the machine bed and extending transversely of the spindle axis. The knife carriage 20 is reciprocated along the ways 21 by means of drive motor 22 which is geared to a pair of heavy ball screws 24 which engage suitable threaded sleeves on the carriage.

A veneer knife 25, secured to a suitable knife frame 26, and a nose bar 28, secured to a pressure bar frame 29, are mounted on the knife carriage 20 in axial alignment with the spindle axis. The veneer knife 25 and the nose bar 28 in this instance are both approximately 110″ in length so as to overhang the ends of the block which is about 102″ in length. The veneer knife and its frame 26, and the nose bar and its frame 29, are joined at their ends to a pair of arcuate trunnions 30 which engage a corresponding pair of trunnion guideways 31 situated on the knife carriage. The trunnion mounting is such that the knife and pressure bar assembly is adapted to pivot about an axis substantially coincident with the cutting edge of the knife. This permits the knife angle or pitch to be adjusted from 90 degrees to a slightly smaller angle as the knife approaches the rotational axis of the block.

The veneer lathe 10 is provided with a backup roll 32 which may be approximately 6″ in diameter and 12″ in length. The backup roll is journaled within a depending carriage 34 adapted to reciprocate along an inclined guideway on a mounting bracket 35 spaced well above the spindle axis. The mounting bracket is rigidly fixed to support beam 36 extending between a pair of pedestals 38 attached respectively to the headstocks. The roll carriage 34 and the backup roll 32 are disposed to move bodily along an axis passing through the rotational center of the spindles and the block, the axis in this instance being tilted at an angle of about 13 degrees from vertical in a direction away from the knife. This axis represents the plane of the forces tending to push up the block as the knife peels the veneer from it.

The backup roll carriage 34 is driven along its guideway by means of a bidirectional d.c. servo motor 39. The latter is coupled to a ball screw gearbox 40 which drives a ball screw 41 connected to the backup roll carriage. Such arrangement causes the backup roll to track the periphery of the block as the block diameter decreases during the veneer peeling operation. The movements of the backup roll are coordinated with the movements of the knife by means of a digital control and associated computer software program.

In order to adjust the pitch of the veneer knife, follower arms 42 are connected to the respective ends of the knife frame 26. Each follower arm 42 has a roller 44 which engages the upper face of a corresponding pitch rail 45. The pitch rails are mounted on the machine bed 11 adjacent each end of the knife carriage. They may be typically set to slope downwardly toward the spindle axis at the rate of $\frac{3}{4}''$ in 2 feet. Both pitch rails 45 may be raised and lowered in unison by the pitch rail motor 46 which is geared to their respective jack screws 48. The downward slope of the pitch rails causes the knife to turn slightly away from the block as the knife approaches the center of the block. Raising the pitch rails 45 causes the knife to tilt into the wood; lowering the pitch rails causes the knife to tilt away from the wood.

The knife and pressure bar assembly is normally overbalanced and, as viewed in FIG. 2, tends to rock counterclockwise under force of gravity. This results in maintenance of good contact between each follower roller 44 and its associated pitch rail 45 for all positions of the knife carriage. Where required by operating conditions, the slope of the pitch rails may be increased or decreased by declutching the front or the rear pair of jack screws 48 and then driving the remaining pair up or down by means of the pitch rail motor 46.

In accordance with the present invention, provision is made for quickly detecting an out of equilibrium condition during a veneer peeling operation by utilizing the cutting edge of the knife as a signal source. This is accomplished in the present instance by modifying the knife support bar 50 and an associated one of the knife clamps, identified by the numeral 58, to define an unsupported span 52 of the knife blade 25 in or near the medial portion of the block. This unsupported span 52, which extends transversely the full width of the knife blade, is then placed in contact with an extremely sensitive deflection sensor 54 nested within the knife support plate. The sensor 54 reacts to minute lateral deflections of the knife edge which may be on the order of 0.001″ to 0.0015″.

Referring more specifically to FIGS. 3, 4, 6 and 7, it will be noted that the medial portion of the knife support bar 50 is formed with a relatively wide shallow groove 55 running transversely thereof for the full width of the knife blade. In the present instance, the groove 55 may be approximately 9″ in length and about 0.020″ in depth. Similarly, a corresponding shallow groove 56 also about 0.020″ in depth, is formed in the clamping face of adjacent knife clamp 58 and extends transversely the full width of the knife blade. The groove 56 thus defines in the clamp 58 a pair of spaced apart clamping surfaces, each approximately $1\frac{1}{2}''$ in width, separated by the groove 56 which is approximately 9″ in length.

Figure 6:
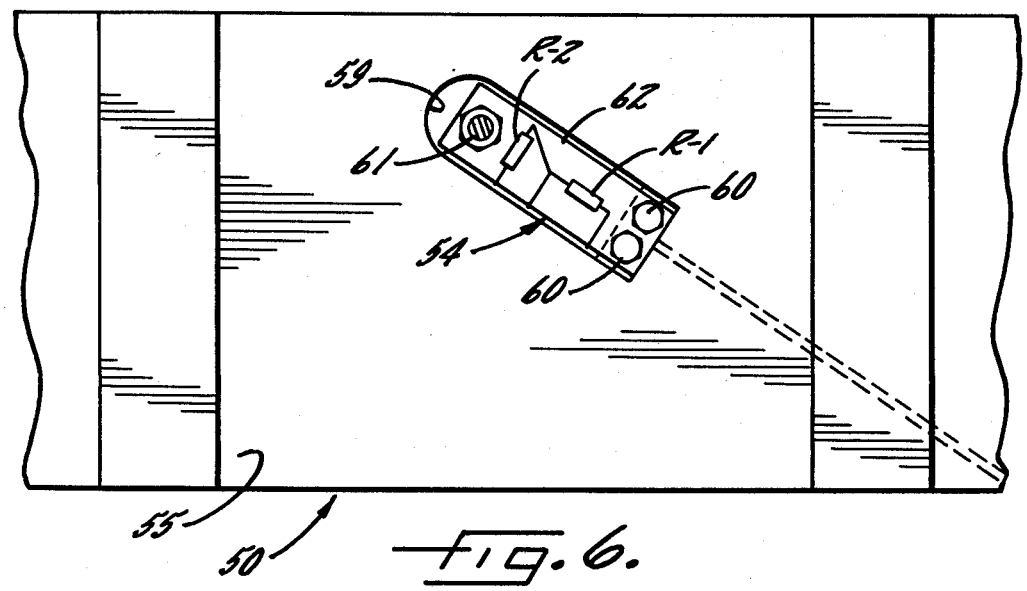
FIG. 6 is a fragmentary plan view illustrating the knife support bar and the relieved area thereon opposite the unsupported section of the knife and in which the sensor is situated.
Figure 7:
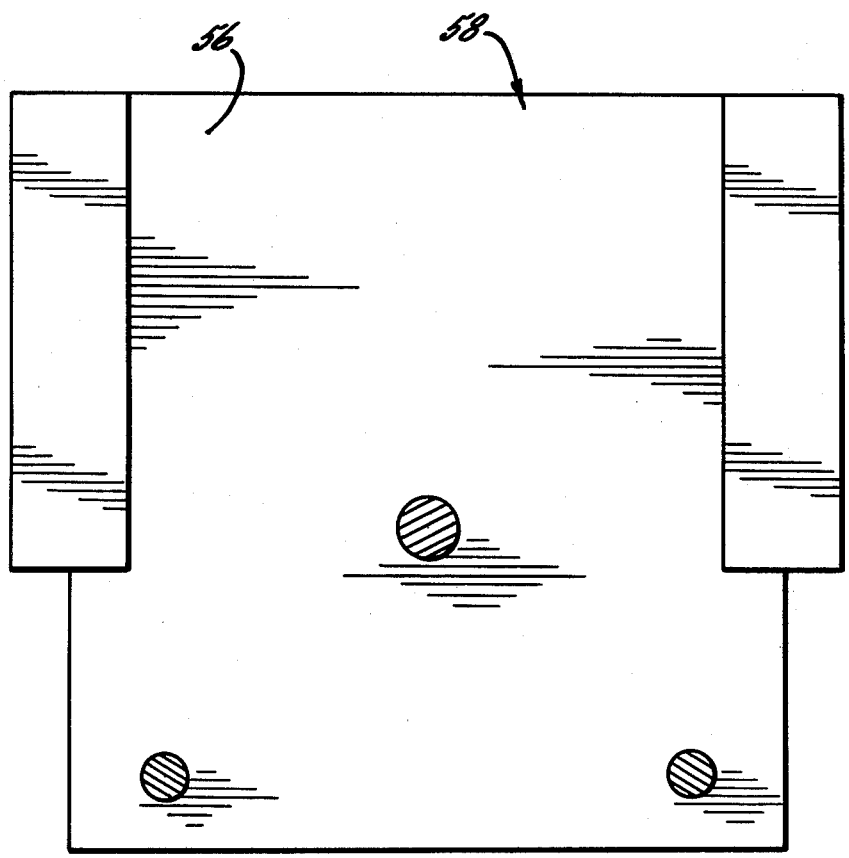
FIG. 7 is a plan view of the inside face of the knife clamp which straddles the unsupported section of the knife.

To accommodate the sensor 54, an appropriate compartment 59 is formed in the grooved area 55 of the support bar. The compartment is of appropriate size and depth to house the sensor 54 and place it in contact with the unsupported span 52 of the knife. As indicated in FIGS. 3, 4 and 6, one end of the sensor is securely attached to the knife support bar 50 as by bolts 60, while its opposite end has a stud or button 61 disposed in abutting engagement with the unsupported span 52 of the knife. A given preload is interposed between the stud 61 and the knife span 52 by deflecting the sensor on the order of 0.030″. Such preload may be adjusted as by the nuts on the stud.

The sensor 54 is a highly sensitive strain gage which may, for example, be a BLH foil type gage supplied by Baldwin Lima Hamilton Corporation. Such a gage comprises a stainless steel bar 62 covered on one face with a barrier layer of epoxy resin. A flexing resistor R-1, which may be a small rectangular strip of metallic foil approximately 3/16"×5/16", is mounted on the epoxy barrier with its longer dimension parallel with the longer dimension of the stainless steel bar 62. A non-flexing resistor R-2, comprising an identical strip of metallic foil, is mounted on the epoxy barrier with its longer dimension disposed transversely of the stainless steel bar. A second barrier layer of epoxy resin covers the foil resistors and adjacent portions of their lead wires.

The sensor 54 is mounted in the knife support bar compartment 59 with the foil resistors facing the unsupported span 52 of the knife. Upon flexing of the stainless steel bar 62 in response to deflection of the unsupported span 52 of the knife, the resistance of resistor R-1 will increase or decrease in proportion to the direction and amplitude of the deflection. The resistance of the resistor R-2 will remain constant. The resistance of both resistors will vary identically with temperature changes, thus neutralizing the effect of temperature changes on the output of the gage.

Figure 8:
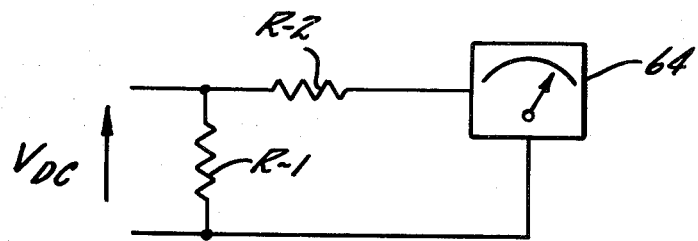
FIG. 8 is a circuit diagram illustrating manual pitch adjustment correction based on deflection signals from the knife edge.

Referring to the circuit diagram shown in FIG. 8, the variable resistor R-1 and fixed resistor R-2 are connected together by their common lead. The opposite leads of the resistors are connected across an ammeter type readout instrument 64. A power supply which in this instance happens to be 12 Volts d.c. is connected across the common lead of the resistors and an opposite lead of the resistor R-1. As the resistance of variable resistor R-1 decreases in value due to deflection of the strain gage 54 in one direction, the current through resistor R-1 will increase in value and that through R-2 will decrease in value. The ammeter 64 will then show a deflection to the left. Conversely, as the resistance of R-1 increases in value due to an opposite deflection of the strain gage, the current through resistor R-1 will decrease in value and the current through resistor R-2 will increase. The ammeter 64 will then show a deflection to the right. The scale of the ammeter is calibrated to read the amplitude of the knife edge deflection, while the needle swing indicates the direction, based on the resistance variations from the strain gage 54. The ammeter 64 may be situated at the veneer lathe operator's station so as to keep him apprised of the existence of an out of equilibrium condition of the lateral forces on the veneer knife and enable him to take appropriate corrective action as by jogging the pitch rail motor to raise or lower the pitch rails so as to restore substantial equilibrium. In the event that another readout device should require a stronger signal than the ammeter 64, a suitable amplifier could be interposed between the strain gage sensor 54 and the readout device.

Figure 9:
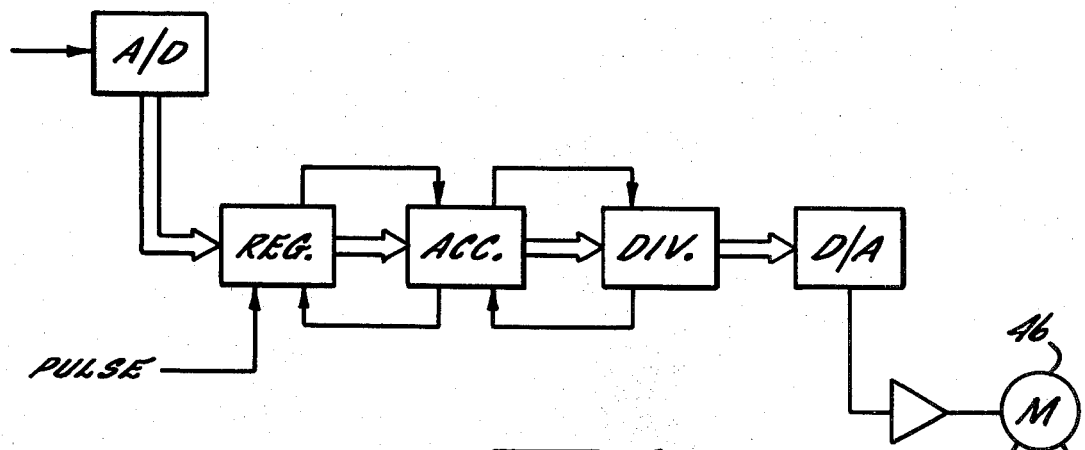
FIG. 9 is a circuit diagram illustrating automatic pitch adjustment correction based on deflection signals from the knife edge.

Turning next to FIG. 9, a circuit diagram is there shown including provision for amplifying the deflection signal from the sensor 54, taking an average of the signal during the processing of 10 logs in the lathe, and applying the average signal to the control of the pitch rail motor to effect an appropriate correction in knife angle or pitch.

More specifically, the analog signal from the sensor 54 is received by an analog-to-digital converter A/D. The analog signal received is continuous and gives a continuous indication of the blade deflection. The digital signal from the analog-to-digital converter is coupled on a bus to a register REG. This digital signal is available at the register but is not stored until a pulse is received on the pulse line indicative of the log being peeled to a diameter of, for example, 13 inches. The register then reads the digital signal which is coupled from the analog-to-digital converter. The top single line from the register REG to the accumulator ACC is intended to depict a signal line through which the register sends a pulse to the accumulator indicating that it has read a new digital value. In response a pulse is sent on the lower single line from the accumulator back to the register telling it to output the latest digital value on the bus. The accumulator reads this value and adds it to previously accumulated values. The accumulator adds 10 of these digital values together internally and then signals the divider with a pulse, indicating that 10 digital readings have been accumulated. The divider DIV then sends a pulse on the lower line to the accumulator, in response to which the accumulator places the total digital value of the 10 readings on the bus and couples it to the divider. Subsequently, the accumulator clears its internal register. The divider now divides the digital value from the accumulator by 10 to obtain an average value of the 10 readings. The divider couples this average value to a digital-to-analog converter D/A. The output register of the divider is read by the digital-to-analog converter and subsequently cleared. The digital-to-analog converter then produces an analog signal indicative of the average deflection of the previous 10 logs, and this analog value is coupled through an appropriate amplifier circuit to control the pitch rail motor 46 to effect an appropriate change in knife angle.

When the veneer lathe is operating with the knife in substantial equilibrium, including a slight bias toward the wood, optimum veneer cutting conditions are established as illustrated in the diagramatic view shown in FIG. 5. Under these conditions the veneer being cut tends to flow evenly through the gap between the cutting edge of the knife and the projecting end portion of the nose bar and the thickness of the veneer can be held within a tolerance of 0.002"–0.003". The result is that less power is required to cut the veneer from the block, increased speed of cutting becomes possible, and the quality of the veneer produced is enhanced.

What is claimed is:

1. In a veneer lathe having power spindle means for rotating a wood block on the spindle axis, a knife carriage disposed for movement transversely of said spindle axis, and a backup roll positioned in timed relation with the knife carriage, the combination comprising:
   (a) A knife support rockably mounted on said carriage;
   (b) a knife carried by said support for movement laterally of the spindle axis;
   (c) means for clamping said knife in said support;
   (d) means defining a laterally unsupported portion of said knife intermediate the ends thereof;
   (e) sensor means disposed in engagement with the unsupported portion of the knife for sensing the lateral deflection thereof; and
   (f) said sensor means being adapted to generate a signal corresponding to said lateral deflection in amplitude and direction.

2. The combination set forth in claim 1, wherein said sensing means is adapted to generate a signal corresponding to the lateral deflection of the knife edge in amplitude and direction.

3. In a veneer lathe having power spindle means for rotating a wood block on the spindle axis, a knife carriage disposed for movement transversely of the spindle axis, and a backup roll positioned in timed relation with the knife carriage, the combination comprising:
   (a) a knife support mounted on said knife carriage;

(b) a knife support bar mounted on said knife support;

(c) means defining a relatively shallow groove running transversely of said support bar intermediate the ends thereof;

(d) a knife mounted on said knife support in abutting relation with said knife support bar;

(e) a knife clamp mounted on said knife support in abutting relation with said knife;

(f) means defining a relatively shallow groove running transversely of said clamp;

(g) said grooved portions of said knife support bar and said knife clamp being disposed in alinement on opposite sides of said knife; and (h) said grooved portions together defining an unsupported span intermediate the ends of said knife, said span being adapted to initiate deflection signals during veneer cutting.

4. The combination set forth in claim 3 and which further comprises:

(i) means defining a compartment in said transversely grooved portion of said knife support bar;

(j) a sensor mounted in said compartment adapted to engage said unsupported span of said knife for detection of knife edge deflection during veneer cutting.

5. In a veneer lathe having power spindle means for rotating a wood block on the spindle axis, a knife carriage disposed for movement transversely of said spindle axis, and means for decreasing the pitch of said knife as the same is moved toward said spindle axis, the combination comprising:

(a) a knife mounted on said carriage for movement laterally of said spindle axis;

(b) means on said carriage defining a laterally unsupported area of said knife intermediate the ends thereof for indicating lateral deflection of the edge of said knife during veneer cutting;

(c) sensor means for measuring lateral deflection of said unsupported area of said knife and thereby generating a signal corresponding to the lateral deflection of said knife edge in amplitude and direction; and (d) readout means for displaying the amplitude and direction of said lateral deflection in response to said signal.

6. The combination set forth in claim 5, including means for amplifying said deflection signal as an input to said readout means.

7. In a veneer lathe having power spindle means for rotating a wood block on the spindle axis, a knife carriage disposed for movement transversely of said spindle axis, and pitch control means for decreasing the pitch of said knife as the same is moved toward said spindle axis, the combination comprising:

(a) a knife mounted on said carriage for movement laterally of said spindle axis;

(b) sensor means on said carriage for generating a signal corresponding to the lateral deflection of said knife edge in amplitude and direction from an equilibrium condition;

(c) means for averaging a series of said signals during processing of several wood blocks in said lathe;

(d) means for amplifying the average of said signals and converting same from analog to digital form; and (e) means for applying said average signal in digital form to said pitch control means in the proper direction to restore the knife edge to substantial equilibrium.

8. The combination set forth in claim 5, wherein said sensor is a strain gage.

9. The combination set forth in claim 8, wherein said strain gage is preloaded.

10. In a veneer lathe having power spindle means for rotating a wood block on the spindle axis, a knife carriage disposed for movement transversely of said spindle axis, and means for adjusting the pitch of said knife as it is moved toward said spindle axis, the combination comprising:

(a) a knife support mounted on said carriage;

(b) a knife support bar mounted on said knife support;

(c) a knife carried by said support and extending longitudinally thereof;

(d) means for clamping said knife in said support;

(e) means on said knife support and a portion of said clamping means defining a laterally unsupported area intermediate the ends of said knife;

(f) means disposed in engagement with the unsupported portion of the knife for sensing the lateral deflection thereof;

(g) said sensing means being adapted to generate a signal corresponding to the lateral deflection of the edge of said knife in amplitude and direction; and (h) readout means responsive to said signal for indicating the amplitude and direction of said knife edge deflection.

11. In a veneer lathe having power spindle means for rotating a wood block on the spindle axis, a knife carriage disposed for movement transversely of said spindle axis, and means for adjusting the pitch of said knife as it is moved toward said spindle axis, the combination comprising:

(a) a knife support mounted on said carriage;

(b) a knife support bar mounted on said knife support;

(c) a knife carried by said support and extending longitudinally thereof;

(d) means for clamping said knife in said support;

(e) means on said knife support and a portion of said clamping means defining a laterally unsupported area intermediate the ends of said knife;

(f) sensor means disposed in engagement with the unsupported portion of the knife for generating a signal corresponding to the lateral deflection of said knife edge in amplitude and direction;

(g) means for averaging a series of said signals during processing of several wood blocks in said lathe;

(h) means for amplifying the average of said signals and converting same from analog to digital form; and (i) means for applying said average signal in digital form to said pitch control means in the proper direction to restore the knife edge to substantial equilibrium.

12. The combination set forth in claim 11, wherein said sensor is a strain gage.

* * * * *